Dec. 10, 1957 L. E. DAHLBERG 2,816,025
PHOTOETCHING EMBOSSING DIES
Filed July 23, 1953 2 Sheets-Sheet 1

INVENTOR.
LE ROY E. DAHLBERG
BY
ATTORNEY

Dec. 10, 1957 L. E. DAHLBERG 2,816,025
PHOTOETCHING EMBOSSING DIES
Filed July 23, 1953 2 Sheets-Sheet 2
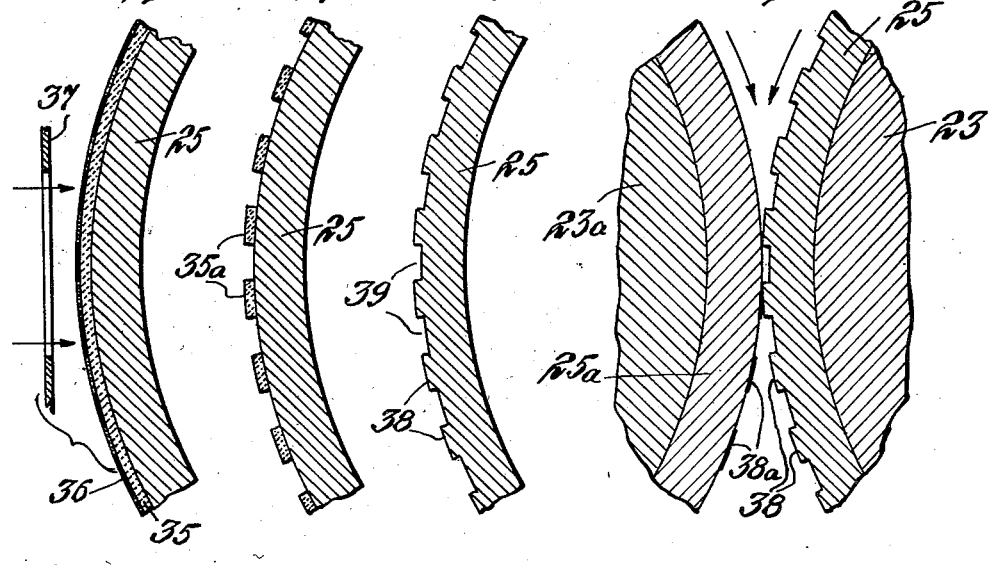
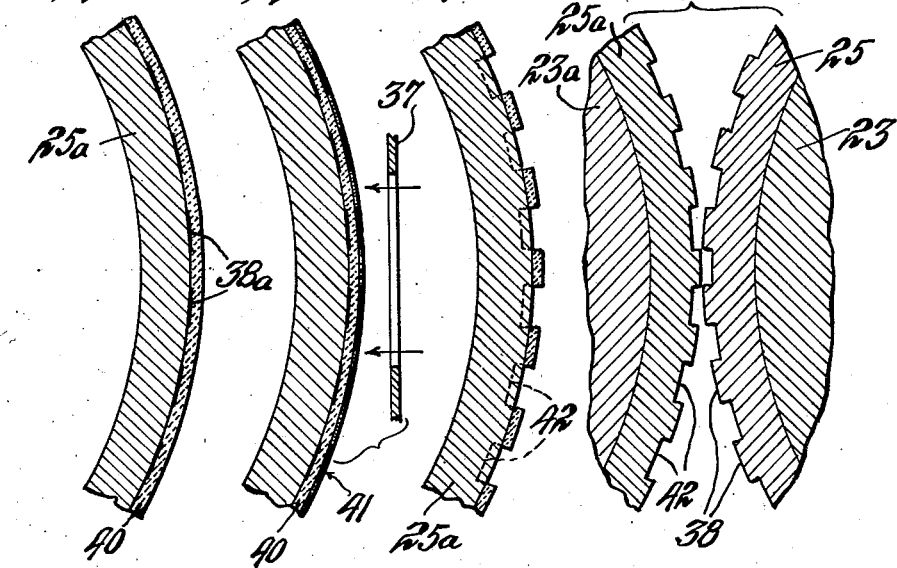
INVENTOR.
LE ROY E. DAHLBERG
BY
ATTORNEY

United States Patent Office 2,816,025
Patented Dec. 10, 1957

2,816,025

PHOTOETCHING EMBOSSING DIES

Leroy E. Dahlberg, Lincolnwood, Ill., assignor to Croname, Incorporated, Chicago, Ill., a corporation of Illinois Application July 23, 1953, Serial No. 369,872

8 Claims. (Cl. 96—37)

The invention disclosed in this patent application relates to the manufacture of dies for embossing sheet metal such, for example, as used for the sill plates of automobile doors.

Objects of the invention are to provide accurately meshing die sets which can be produced at low cost and in which the active portions of the dies will be replaceable, lightweight parts which can be readily handled.

In the past the companion metal working dies have been produced by expensive and time consuming engraving and other fine machine tool working requiring expert machine tool services. The accuracy of such dies has depended upon the care and skill exercised by the individual die maker.

The present invention avoids these difficulties and limitations by forming matching male and female metal working dies through a photo-etching method of manufacture, achieving great savings in time and labor.

Briefly, this method involves the photo-etching in relief or depression on one die and then after maching the two dies, the photo-etching in the opposite sense on the companion die member, thus to complete a perfectly matched pair of dies through etching operations and free of the expense and uncertainty of tooling operations.

An important feature of the invention is the construction of the dies with the active part as a relatively thin etched surface portion supported and backed up by a solid, rigid body.

With dies in the form of companion rolls the backing member may be a cylindrical core and the etched surface member a ring or sleeve fixed solidly on the core.

With dies in the form of a single roll and companion flat platen, one etched surface member may be in the sleeve form and one in the form of a lightweight platen on the flat bed of a press. Also, the matching design may be etched in both the roll and the flat platen member or in only one or the other.

Other important features, objects and advantageous results attained with this invention are set forth or will become apparent in the course of the following specification.

The drawings accompanying and forming part of the specification illustrate a present practical embodiment and method of procedure. Structure, arrangement and method, however, may be modified and changed, all within the true intent and broad scope of the invention as hereinafter defined and claimed.

Fig. 1 in the drawings is a broken part sectional view of a pair of etched embossing rolls embodying the invention and operating as the companion rolls in an embossing press;

Figs. 4 to 11 are broken sectional diagrammatic views illustrating progressive steps in the etching of the sleeves into matched, accurately intermeshing relation, Fig. 4 showing exposure of the photosensitive resist to light through an overlying film carrying the pattern; Fig. 5 showing the resist baked on the shell in the design afforded by the film and the unbaked portions of the resist washed away down to the clean metal; Fig. 6 the shell etched according to the design and the resist removed; Fig. 7 showing the second shell matched to and taking the reverse impression from the first shell; Fig. 8 a section of the second shell carrying on its surface the impression from the first etched shell coated with transparent photosensitive etching resist; Fig. 9 a portion of the second shell coated with the resist and the negative or reverse of the first film secured in registered relation over the impression and the same exposed to light; Fig. 10 the second sleeve after baking of resist thereon in the complementary design and removal of unbaked resist preliminary to etching; and Fig. 11 showing the die shells completed and in meshing relation.

Figure 1:
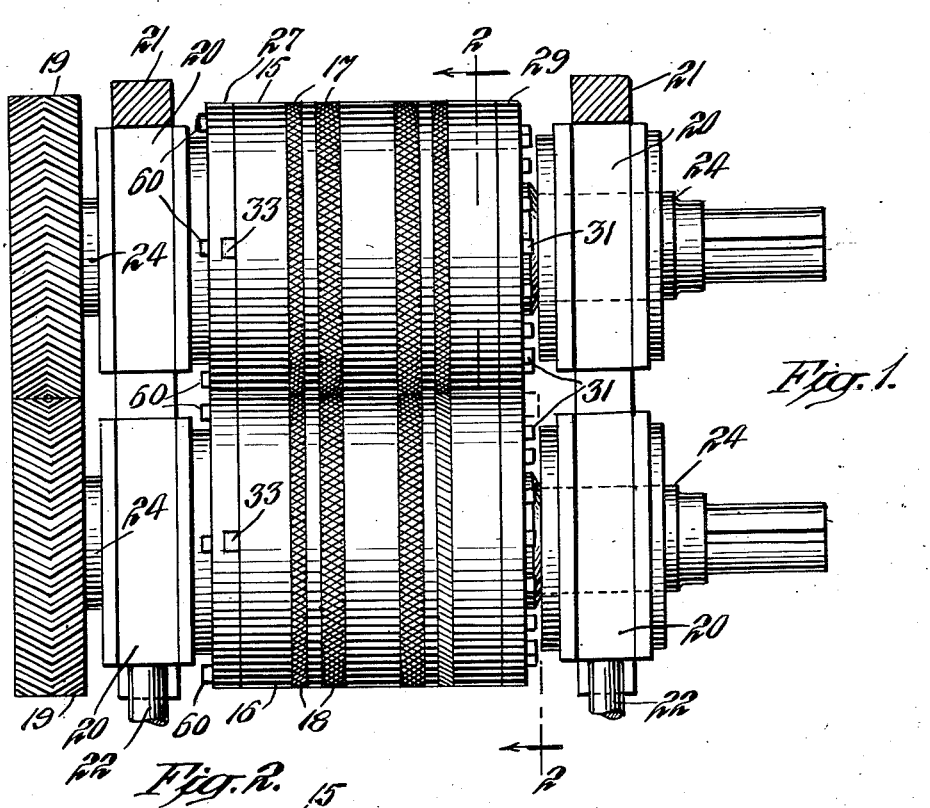
Figure 2:
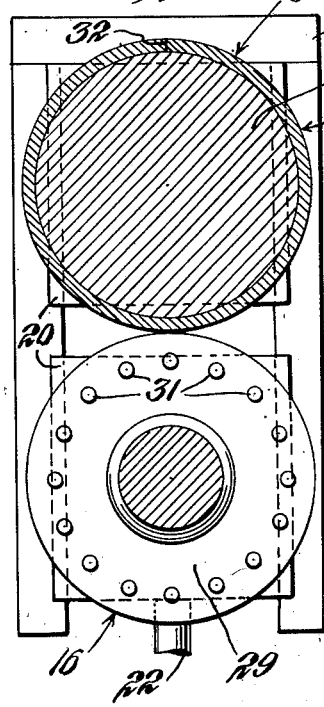
Fig. 2 is a vertical cross sectional view of the same on substantially the plane of line 2—2 of Fig. 1.

In Figs. 1 and 2 the companion rolls of a single die set are indicated at 15, 16, one the positive or embossing die and the other the corresponding negative or debossing die, and carrying at 17, 18 the counterpart die elements in reverse.

These two die rolls are geared together at 19 to rotate in synchronism, the gears being of deep mesh to permit necessary relative adjustment of the rolls for passage of the stock therebetween.

The rolls are shown journaled in bearing blocks 20, mounted in a suitable framework 21 and relative adjustment of the rolls as effected by hydraulic plungers 22 shown acting on the bearing blocks of the lower roll.

In the construction illustrated each roll is made up of a solid or rigid central cylindrical core 23 with journal extensions 24 and a relatively light and thin ring, shell, band or sleeve 25 covering the core.

The core and its shaft extensions are of substantial, solid construction, having all the strength necessary to carry the embossing load, and the covering 25 is a surface shell of uniformly hard steel or steel alloy capable of effecting the displacement of the metal in the embossment and debossment operations.

Important advantages in economy and efficiency are attained with this construction. Under ordinary embossing roll technique, the rolls must be kept soft during the mechanical working-in of the pattern or design. The subsequent tempering or case hardening introduces a hazard of distortion or a very thin case hardening. The present photo-etching method enables use of fully hardened alloy steel shells or rolls, having perfectly ground surfaces to etch for embossing, assuring utmost accuracy and durability, without increasing the cost.

To secure the shell firmly and solidly on the core without any freedom or floating effect, the ends of the shell are shown beveled at 26 and the core is shown as having a flange 27 bolted thereto at one end, at 60, undercut at 28 to engage the bevel on one end of the shell, and a flange 29 having a reverse bevel 30 to fit the other end of the shell and secured to the other end of the core by bolts 31.

The sleeve is shown split longitudinally at 32 so that the wedging accomplished by clamping the beveled ends will have the effect of collapsing or shrinking the shell circumferentially solidly down on the core.

Figure 3:
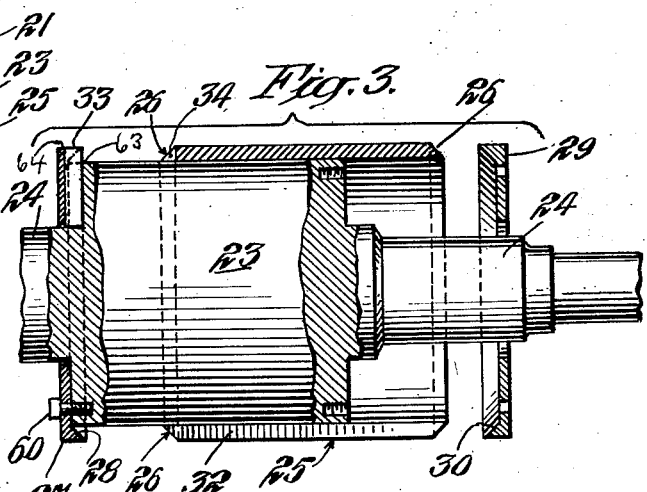
Fig. 3 is a broken longitudinal sectional view of one of the rolls showing one separable end head released and the etched shell constituting the active surface member partly slipped off the central core of the roll.

Relative rotational tendency is positively overcome in the illustration by a radial key 33, Fig. 3, intercepting the undercut bevel groove 28 in the flange 27 and engaging a locating notch 34 in the adjoining beveled end of the shell. This key is shown as located in matching keyways 63, 64 cut in the end of the core and in the face of the flange 27, where it may be held by one or more screws driven into the end of the core.

The construction described provides a positive means of locating and securing the shells in predetermined solid engagement on the cores, with opposing elements of the dies in accurate register.

This construction permits of ready removal, replacement and substitution of die shells.

In addition to removing the end flange 29, the other flange 27 may be loosened to free that end of the shell, enabling the shell, because of its split construction, to spring open slightly and thus to slip freely off the core.

These shells may be relatively thin and light enough to be handled by one person, characteristics of great advantage in preparing the rolls for embossing operations.

Before etching the shells are thoroughly cleaned, usually degreased, sand blasted and then copper and silver flashed.

The pattern or design which the dies are to reproduce may first be made up as a drawing. From this drawing positive and negative photographic prints or films may be taken to be used for photo-etching in reverse the companion die rolls.

First one shell is finished from one film, say the positive film, and then the other shell, after being prepared ready for the resist and having been slit, is mounted on the other core of the machine in which it is to be used and in its final fixed relation to the first shell, and the first completed shell brought up against the second shell to roll the impression from the first shell into the silver coating of the second shell, after which the second shell is removed from the embossing machine, coated with the resist and the opposite or negative film registered over the impression and the photoetching procedure completed.

The shells may then be baked at approximately 250° F. for about one-half hour to heat thoroughly, then be washed with cyanide solution and pumice scrubbed lightly in hot water to remove any oxidation that may have formed on the silver.

For convenience in handling, the sleeves or shells may be temporarily mounted on light mandrels of wood or the like on shafts by which they may be turned in the further processing.

The shell which is to be finished first may then be coated with a deep etch resist, sensitive to light and acid resistant. This coating may be by spraying or otherwise to create a layer of substantially uniform thickness.

This etch, such as that known as Deep Etch Solution No. 1 supplied by Sinclair & Valentine Company, and made up of calcium chloride, iron perchloride, hydrochloric acid and water, preferably is color bearing to enable matching the color of the applied coating to a standard color sample known to have the required thickness of resist for the particular depth of etch required which, for deep embossing may be .008", more or less.

The rolls may be rotated slowly while spreading the "cold top" to insure uniformity of thickness. The comparison of the color of this coating with a known color standard enables application of proper thickness of resist for the depth of etch desired.

The resist which it is preferred to use has a translucency with a slight color tint. It has been found that there must be a certain thickness of this resist to withstand the acids in the etching process. Also, it has been determined that the slight tint in the resist deepens in color as the coating is increased in depth. The color, therefore, becomes an index as to thickness of resist and, consequently, an indication of the depth of etch obtainable. Therefore, a resist of a definite color will provide a definite depth of etch. These facts being known, it is only necessary to apply resist to a color which will match the color of a standard sample which can be held by hand in comparative relation to the resist applied or being applied to the roll. In other words, with samples of different colors and each representing a definite depth of etch, it is only necessary to pick out the color sample representing the desired depth of etch and then apply just that amount of resist which will match the color of the comparison sample.

There are many advantages which might not be at once apparent. The resist must flow evenly over the entire roll. Any variation in thickness or depth of resist will show by lack of uniformity in color. Therefore, any variations in thickness may be quickly detected by comparison of the standard color card with the resist coating on the roll. When such variations are thus detected, it may be necessary to wash the whole resist off and apply the coating anew.

After the resist coating has dried the shell is ready for the photographing of the design thereon.

This is accomplished by wrapping the film for the first roll, say the positive film, about the sleeve, securing it in properly registered relation thereon and exposing it to activating light such as an arc light.

The latter may be effected by placing a light screen in front of the sensitized shell, this screen having an opening about three inches wide vertically to maintain sufficient perpendicularity to the film to avoid distortion from tangent light rays and as long as the widest section of the pattern of the film on the shell. This provides a mask through which a three inch section of the coating may be exposed to an arc light for a time sufficient to bake the pattern of the film into the light sensitive, deep etch coating underneath it.

Allowing a period usually of about eight minutes for this baking operation, the shell may be rotated to expose successive three inch areas, possibly with slight lapping to insure that each portion of the pattern is thoroughly baked onto the sleeve. The baking period may be increased to ten minutes or more as the thickness of the etching solution or other factors may require.

To cut down the step exposure time, a second mask and arc light may be employed at the diametrically opposite side of the shell, or more than two light sources and masks be used simultaneously.

Fig. 4 is illustrative of the steps last described, showing the first shell 25 with the applied light sensitive, deep etch coating 35, the pattern carrying film 36 secured in registered relation thereover and the light for baking the pattern on the shell projected through the mask 37.

The pattern film is temporarily secured over the sensitized shell in any suitable way, as by adhesive tape or the like.

After exposure the film is removed and the pattern is developed on the shell by washing off the unbaked portions of the resist which, as shown in Fig. 5, washes down to the silver flash coating, leaving protected by pattern-outlining sections of resist 35a, those portions of the shell which are not to be etched. Developer known on the market as No. 35 may be used for this purpose, this developer comprising calcium chloride, lactic acid and hydrochloric acid.

An overall exposure to light may then be made to harden the initial forming resist by rotating the shell slowly in front of an arc light about one-half hour, without the mask.

It has been found desirable further to then bake the shell for about one-half hour at approximately 250° F.

The ends, edges, inside circumference of the shell and in fact all parts not to be exposed to the acid, are painted with a resist and this protective resist allowed to dry.

The actual etching may be effected by rotatably supporting the shaft in a cradle suspended to lower the rim of the shell in an etching bath and rotating slowly by a motor driven pulley secured on the shaft.

For a deep etch such as desired, this action may be carried on for a matter of eighty-five minutes, more or less, oxidation being hastened by exposure to air of all parts of the rotating shell out of the etching solution.

After completion of the etch the resist is washed off, leaving those parts, 38, Fig. 6, which were protected by the resist, at the original surface level of the shell and the unprotected portions more or less deeply etched, at 39.

All the background on the male die is etched to the level of the recesses in the male die pattern so as to give equal clearance to the stock within and without the pattern.

After proper washing and drying, the shell with, in this supposed case, the positive of the design etched thereon, is split longitudinally, as in a milling or grinding machine, approximately mid-way between the ends of the pattern.

In this slitting operation enough material is removed to permit a shrinking of the die in mounting it on the core.

This first etched and split shell is then ready for mounting on its core 23, as shown in Fig. 3, by slipping it over the core with the notch 34 aligned with key 33, after which end head 29 is applied and secured by bolts 31 and the bolts of the other head 27, tightened to bind the shell solidly down on the core.

The positioning notches and slits in the shells may be diametrically opposite, as indicated, and the gears 19 connecting the rolls are paired in a definite relation so that when assembled, as shown in Fig. 1, there will always be a fixed relationship between the embossing dies.

The second shell, 25a, Fig. 7, after splitting and mounting solidly on its core in the manner previously described, may then be matched with the first roll to obtain proper registration for the second, in this case the negative etching.

In Fig. 7 this is shown as effected by bringing the rolls together under sufficient pressure to leave an impression 38a on the flash silver coating of the second shell, of the positive design 38 on the first shell.

This impression or imprint 38a, Fig. 8, of the positive design is definite enough to afford a positive means for accurately registering the negative film thereon.

In this view the sleeve is shown as coated with the photosensitive deep etch resist or "cold top" 40, which is sufficiently transparent or translucent to clearly see the impressed design therethrough.

Fig. 9 shows the negative film 41 secured in registered relation over the corresponding impression on the surface of the shell and the negative print being made on this second shell through the mask 37.

Then, after the photographic, developing and baking steps previously described, the second shell is ready, as shown in Fig. 10, for the negative etching operations, which will remove unprotected material at 42 to create the negative or counterpart pattern which, as shown in Fig. 11, will match and accurately mesh the positive pattern etched on the first roll.

This positive meshing of the two etched designs produces actual displacement of the metal when the companion rolls are operated as embossing dies, as shown in Figs. 1 and 2.

By controlling the depth of the etch the finish of the metal to be produced may be varied as part of the design. For example, the female roll may be etched .008" deep and the male roll etched .004" and pressure employed to effect considerably heavier pressure on the background portion of a design than on the highlight portion, giving different surface characteristics to the metal.

Further variations are possible. For instance, a second etch pattern may be applied to previously unetched highlight or surface portions of the male design after the matching pattern has been etched into both rolls to create a background design, corresponding to a "Ben Day" or stipple or any other design.

The hardened steel rings, bands or sleeves constituting the shells are thin enough to be hardened uniformly throughout, enabling operating on heavier gauge and harder metal than might otherwise be possible.

By using different rings on the same roll more than one pattern can be produced at a time, or combinations of patterns may be produced.

In using two or more shells on the same roll, closed holding rings may be interposed on the core of the roll between adjoining shells, fashioned with beveled undercut ends to pull down the shells in the same manner as the end flanges on the core.

One or both rolls may carry pilot pins or the like to serve as gauges for insertion of the metal strips or plates. It is possible also that the rolls may be employed to process continuous strip.

The invention makes it possible to produce dies for the most complicated as well as the simplest designs, at relatively low cost and at great savings in time and labor. The photo-etched die shells are quickly and easily removable, replaceable and interchangeable and are light in weight so as to be readily handled in the preparation and placement of the same.

The gears connecting the rolls are prepared to maintain accurate meshing registration of the positive and negative dies and may be suitably marked or keyed together so that they will always be meshed in the same relationship after having been separated for the operations described.

The formation of the companion dies by photo-etching from companion positive and negative films and the registry of the film of the second roll through the medium of an impression taken from the first, finished roll assures uniformly accurate results in the finished dies.

While for handling and other purposes it has been found generally preferable to make the roll dies with etched shells, it is possible and in some instances may be found preferable to use solid die rolls and to photo-etch the surface of the solid roll dies.

What is claimed is:

1. The method of manufacturing embossing dies comprising preparing positive and negative films of a design to be embossed, applying a photo-sensitive, deep etch resist to the surface of one embossing roll, applying one of the films over said photo-sensitive resist and exposing the same to light, removing said film and developing the resist, etching the surface of the roll in the design outlined by the light activated resist, impressing the etched design of the first roll onto a second roll, coating the second companion roll with photo-sensitive deep etch resist, registering the second film on the coated second roll in accordance with the impression thereon taken from the first roll, exposing the film on the second roll to activating light and then removing the second film and developing and etching the surface of the second roll according to the pattern provided by said second film.

2. The method according to claim 2, including making the rolls with cores and shells removably mounted on said cores and activating and photo-etching the shells apart from the cores.

3. The method of manufacturing embossing dies comprising preparing positive and negative films of a design to be embossed, applying photo-sensitive deep etch resist to the surface of one of two companion die members, applying one of the films over said photo-sensitive resist and exposing the same to light, removing said film and developing the resist, etching the surface of the first die member in the design outlined by the light activated resist, impressing the etched design of the first die member onto the second die member, coating the second die member with photo-sensitive transparent deep etch resist, registering the second film on the coated second die member in accordance with the impression thereon taken from the first die member and visible through the transparent resist, exposing the film on the second die member to activating light and then removing the second film and developing and etching the surface of the second die member according to the pattern provided by said second film.

4. The method according to claim 3, including the steps of making up the die members with cores and thin surface elements removably mounted on said cores and activating and photo-etching said thin surface elements apart from the cores.

5. The method of manufacturing a pair of companion embossing dies comprising preparing positive and negative light patterns of a design to be embossed, applying photo-sensitive etch resist to the surface of one of said members, applying one of the patterns over said resist and exposing the same to light, removing said pattern and developing the resist, etching the surface of said first die member in the design outlined by the light activated resist, impressing the design etched on the first die member onto the surface of the second die member, coating the second die member with a photo-sensitive resist, registering the second pattern on the coated second die member to match the impression thereon applied by the first die member, exposing the pattern on the second die member to activating light and then removing the second pattern and developing and etching the surface of the second die member according to the design provided by said second pattern.

6. The invention according to claim 5 in which the second die member before being impressed from the first die member is coated with an impressionable material such as silver which will take and hold an impression which may be recognized through the resist subsequently applied to the second die member.

7. The invention according to claim 5 including the further steps of photo-etching in the same manner described, additional die formations on said die elements on unetched portions of the die elements produced in said first mentioned photo-etching operations.

8. The invention according to claim 2 in which said shells are split longitudinally for enabling removal from and engagement over the cores and are removed from the cores during the photo-etching steps described and are clamped solidly down on the cores after completion of the photo-etching steps.

References Cited in the file of this patent

UNITED STATES PATENTS

| | | |
|---|---|---|
| 95,344 | Hill | Sept. 28, 1869 |
| 147,767 | Gould | Feb. 24, 1874 |
| 366,755 | Baker | July 19, 1887 |
| 482,267 | Newton | Sept. 6, 1892 |
| 628,587 | Lyon | July 11, 1899 |
| 781,925 | Wattles | Feb. 7, 1905 |
| 815,310 | Reckard | Mar. 13, 1906 |
| 1,938,313 | Bechak | Dec. 5, 1933 |
| 1,947,916 | Mitchell | Feb. 20, 1934 |
| 1,995,973 | Ericksson | Mar. 26, 1935 |
| 2,038,759 | Roberts | Apr. 28, 1936 |
| 2,333,251 | Huggins | Nov. 2, 1943 |
| 2,662,002 | Sunderhauf | Dec. 8, 1953 |

FOREIGN PATENTS

| | | |
|---|---|---|
| 1,909 | Great Britain | 1880 |